Feb. 23, 1937.  C. O. MARSHALL  2,071,416
COMPUTING DEVICE
Filed Nov. 29, 1935  4 Sheets-Sheet 1
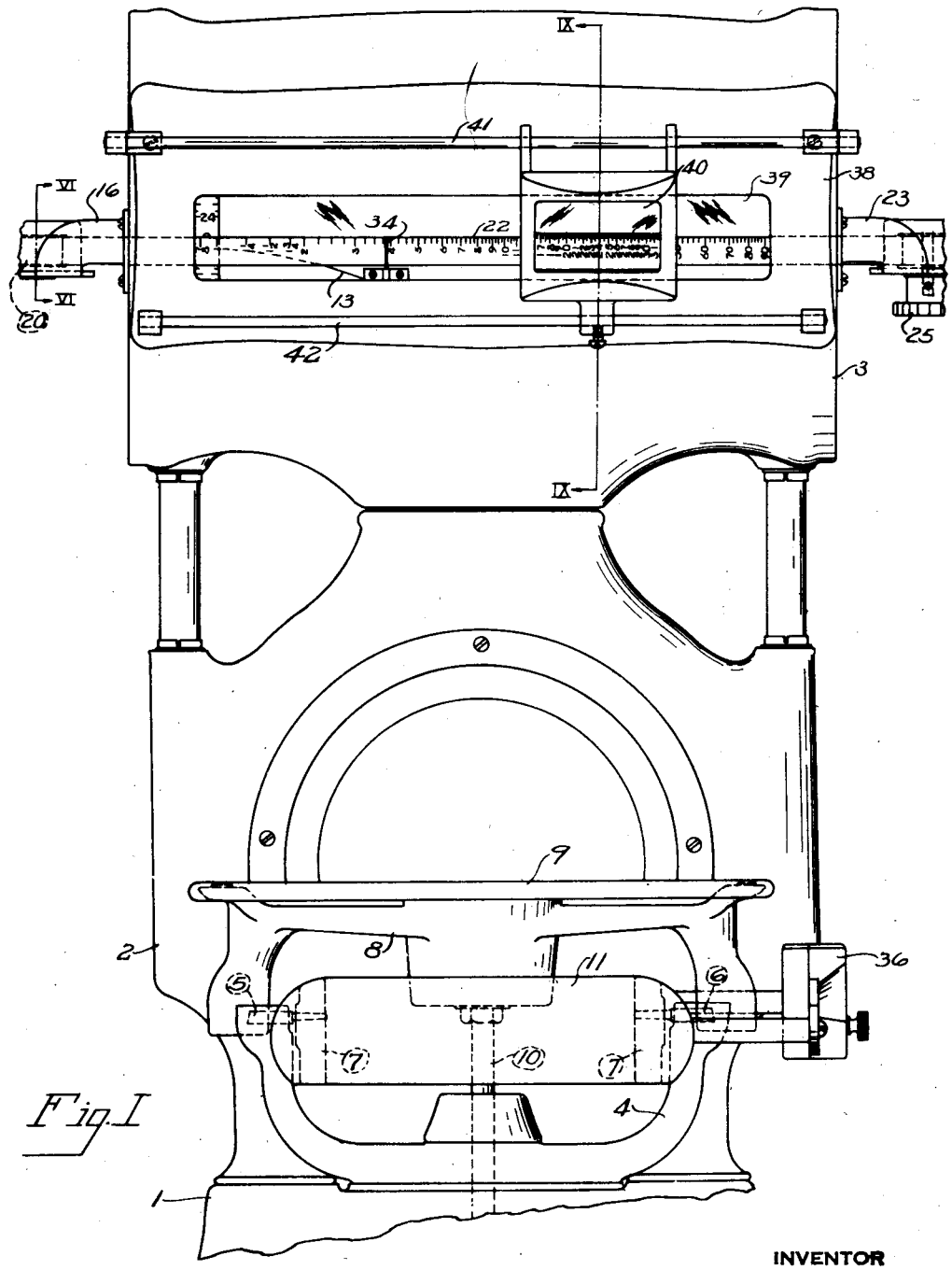
Fig. I
INVENTOR
Charles O. Marshall

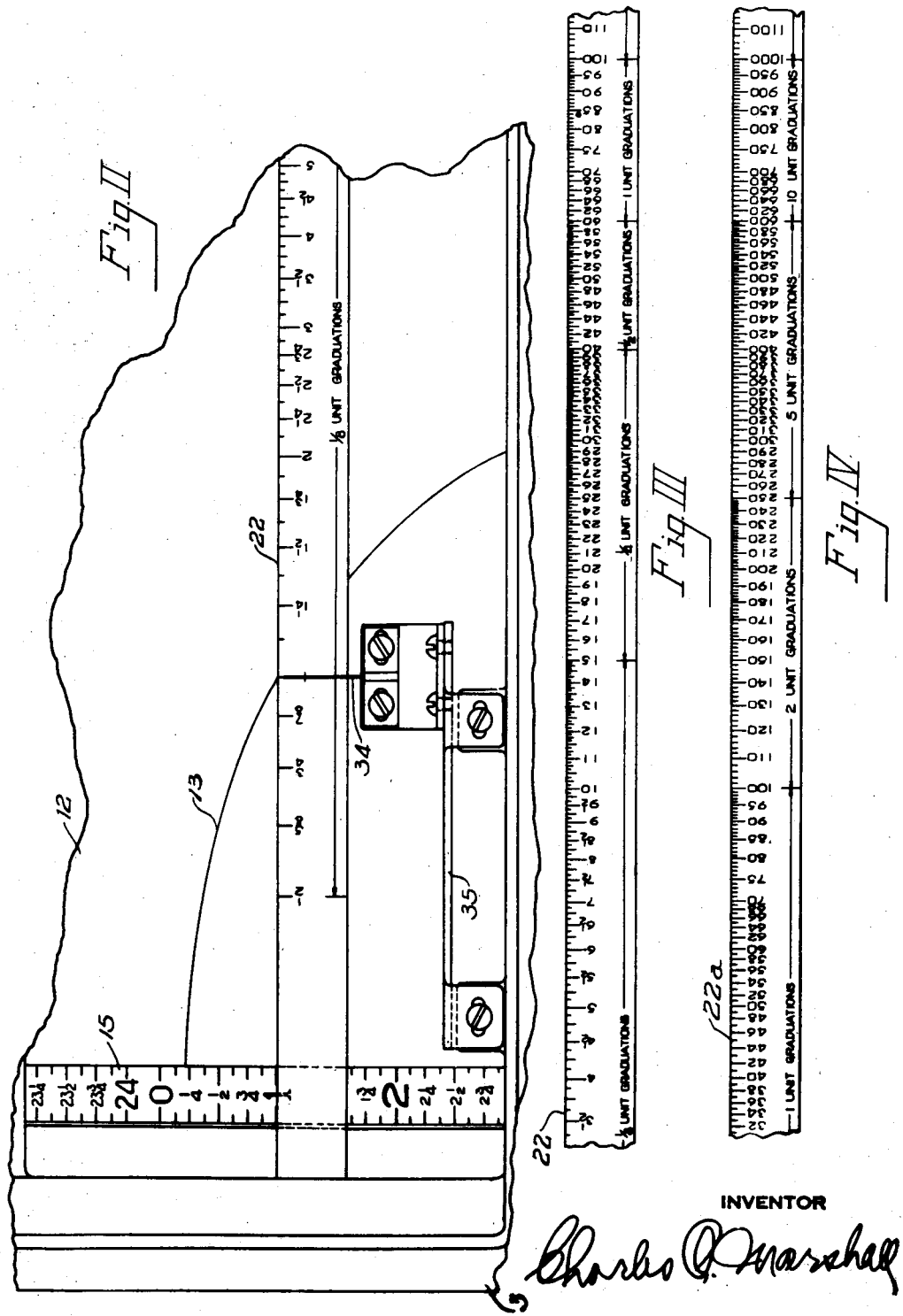

Feb. 23, 1937. C. O. MARSHALL 2,071,416
COMPUTING DEVICE
Filed Nov. 29, 1935 4 Sheets-Sheet 3
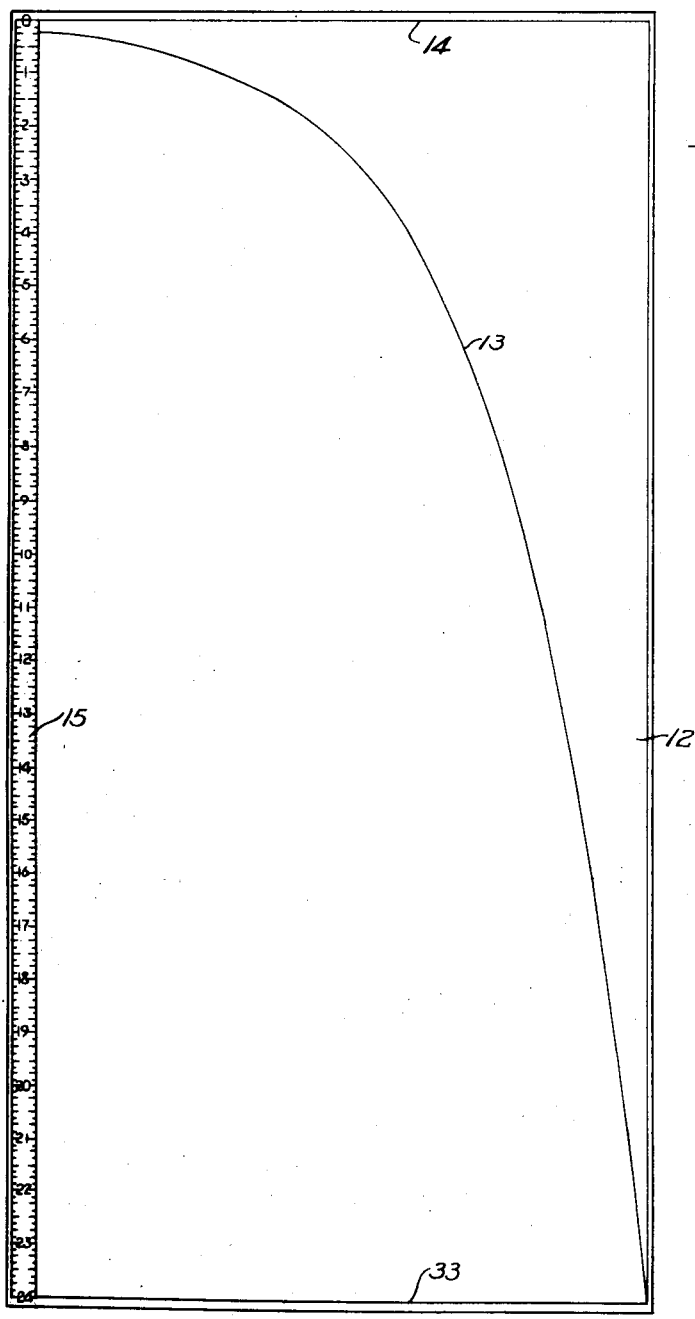
Fig. V
INVENTOR
Charles O. Marshall

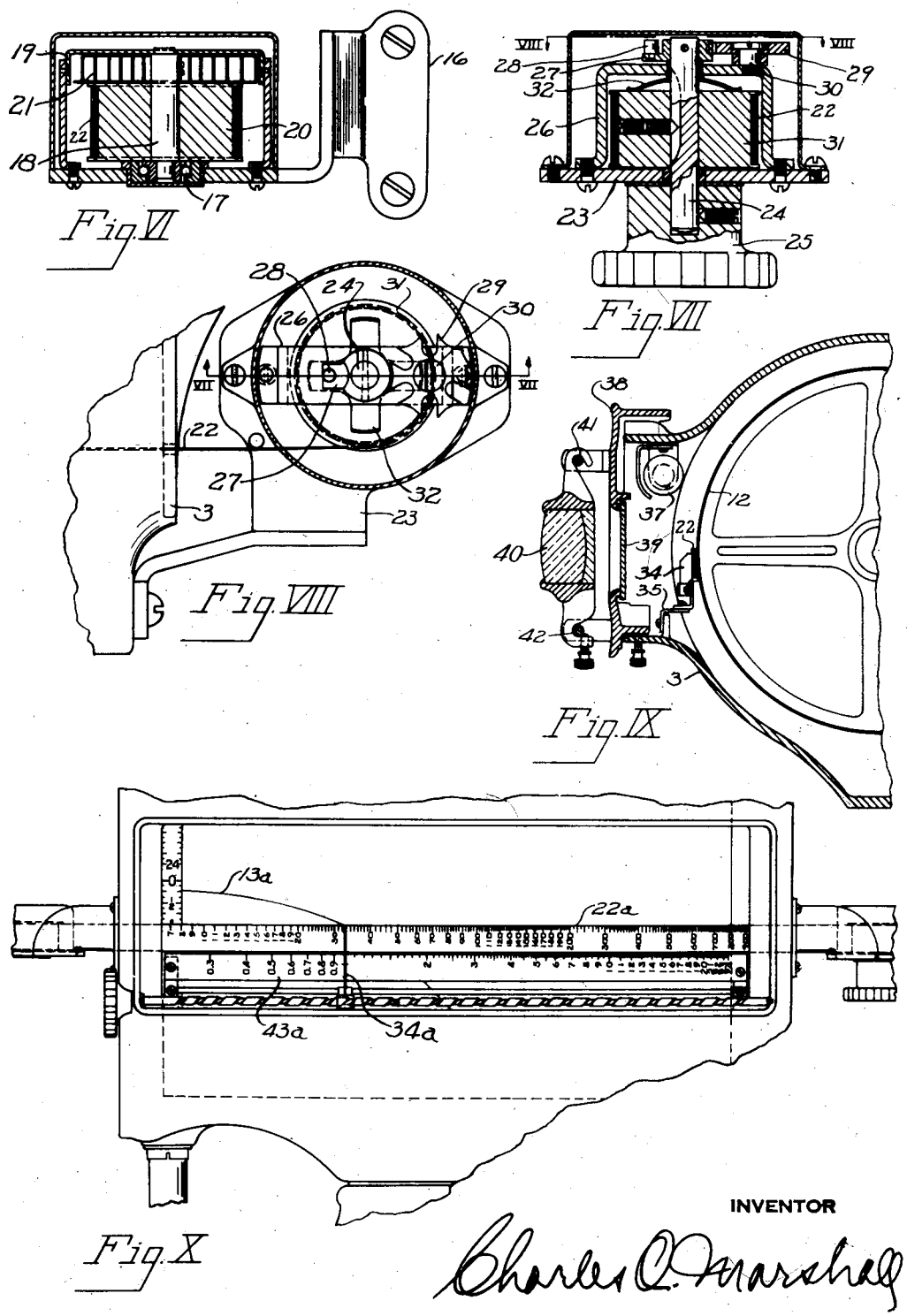

Patented Feb. 23, 1937

2,071,416

UNITED STATES PATENT OFFICE 2,071,416

COMPUTING DEVICE

Charles O. Marshall, Toledo, Ohio, assignor to Toledo Scale Manufacturing Company, Toledo, Ohio, a corporation of New Jersey Application November 29, 1935, Serial No. 52,026

13 Claims. (Cl. 265—29)

This invention relates to computing devices, and particularly to computing measuring devices, and its principal object is the provision of a computing measuring device having adjustable means marked with logarithmically arranged indicia, and having an index, consisting of a curve, so incorporated with the measuring mechanism as to move logarithmic distances along such indicia when the mechanism is moved proportionately to a weight or force or measuring movement acting on the mechanism.

Another object is the incorporation of such a computing device in automatic weighing scales of known construction.

Other objects and advantages will be apparent from the following description, in which reference is had to the accompanying drawings illustrating a preferred embodiment of my invention and wherein similar reference numerals designate similar parts throughout the several views.

In the drawings:—

Figure I is a front elevational view of an automatic weighing scale of the cylinder type embodying my invention, parts being broken away;

Figure II is an enlarged fragmentary front elevational view showing a part of a logarithmically graduated member with a co-operating fixed pointer and movable surface on which is inscribed a logarithmic curve, the device being arranged for indicating weights in pounds and fractions thereof;

Figure III is a similarly enlarged front elevational view showing another part of the logarithmically graduated member;

Figure IV is a view similar to Figure III, showing a part of another member bearing a slightly different series of logarithmically spaced graduations;

Figure V is a view on a reduced scale showing an unrolled cylindrical surface on which is inscribed a curve which constitutes the logarithmically movable index in the form of the invention illustrated in the drawings;

Figure VI is an enlarged side elevational view in section, taken on the line VI—VI of Figure I, showing a spring-operated reel for winding up one end of the member bearing the logarithmically arranged graduations;

Figure VII is a similarly enlarged front elevational view, partly in section on the line VII—VII of Figure VIII, showing a manually-operated reel for winding up the other end of the member bearing the logarithmically arranged graduations;

Figure VIII is a fragmentary top plan view, with parts in section on the line VIII—VIII of Figure VII, showing the manually-operated reel;

Figure IX is a fragmentary side elevational view, partly in section on the line IX—IX of Figure I, showing the relative arrangement of the indicating device, lighting means, and viewing window and lens; and Figure X is a fragmentary front elevational view showing a modified form of the indicating device of my invention, the viewing window and lens being removed.

Referring to the drawings in detail, the weighing scale illustrated has a base 1, upon which is erected an upright housing 2 surmounted by a casing 3. A fulcrum stand 4 is mounted on the base 1 and supports fulcrum pivots 5 and 6 which are fixed to a lever 7. A platform spider 8 is supported upon the lever 7 and carries a load-receiving platform 9, the condition of level of the platform spider being maintained by means of a spider stem 10 which extends downwardly to a check link (not shown) and the weight of the platform spider and platform being substantially offset by a counterweight 11 which is fixed to the lever 7.

The lever 7 is connected to suitable automatic load-counterbalancing means, such as a pendulum or spring, and is also connected to an indicating cylinder 12, the arrangement being such that when a load is placed upon the platform 9, the mechanism moves to a position in which the load is counterbalanced and the cylinder 12 moves through an angle proportionate to the weight of the load. The weighing mechanism is generally similar to that shown and described in United States Patent to Zinke No. 1,984,561.

In the device of my invention, a curve 13 is inscribed upon the surface of the indicating cylinder 12 in the manner indicated in Figure V, the relative axial locations of the points on the curve 13 being proportional to the difference between the logarithms of their circumferential distances from a zero line 14 which extends axially along the cylindrical surface. The cylindrical surface also may be marked, if desired, with a circumferential series of equally spaced graduations 15 numbered to indicate weights of loads in the usual manner.

Supported upon one end of the casing 3 is a bracket 16 having an opening within which is journaled, by means of a ball bearing 17, the lower end of an upright shaft 18, the upper end of the shaft 18 being journaled in a frame 19 which is secured to the bracket 16. A reel 20 is fixed to and carried by the shaft 18 and the shaft and reel are urged in one direction of rotation by a spiral spring 21, one end of which is attached to the shaft 18. Wound upon the reel 20 is one end of a flexible metallic ribbon 22 which passes through the casing 3 and extends in front of the indicating cylinder 12 in close proximity to but out of actual contact with the cylindrical surface.

Fixed to the opposite end of the casing 3 is a bracket 23 having an opening through which extends the lower end of a stem 24 that is equipped with a knob 25, the upper end of the stem extending through a frame 26 and having fixed thereon a collar 27 which carries an upright pin 28 adapted to engage notches in a Geneva stop disk 29 which is mounted for partial rotation on a stud 30 fixed to the frame 26. Since the Geneva stop disk 29 is incapable of a complete revolution, it permits a limited number of turns of the stem 24, in the form illustrated the number of turns of the stem permitted being five in either direction. Fixed upon the stem 24 is a reel 31 upon which the other end of the flexible metallic ribbon 22 is wound and a 4-pronged spring 32 pressed against the upper side of the reel 31 serves to frictionally hold the reel 31 in any position to which it is turned by means of the knob 25.

The flexible metallic ribbon 22 is marked along its upper edge with graduations designated by numbers ranging from a fraction of unity to some high number such, for example, as 10,000, the graduations being spaced logarithmically to correspond to the axial distribution along the cylindrical surface of the points in the index curve 13. While the graduations are spaced logarithmically, they are numbered with the antilogarithms of their respective positions. I shall term this arrangement of graduations and numbers a logarithmic arrangement.

When a load is placed upon the platform 9, the indicating cylinder will turn to a position corresponding to the weight of the load and the curve 13 will intersect the upper edge of the ribbon 22 at a point corresponding in position to the logarithm of the weight of the load. If, for example, 1 lb. be placed upon the platform, the curve 13 will assume the position in which it is shown in Figure II. By turning the knob 25, the ribbon 22 may be shifted until the point of intersection is at the graduation numbered 1. When the ribbon is in this position, a load of 1¼ lbs. on the platform will cause the curve 13 to intersect the upper edge of the ribbon 22 at the graduation numbered 1¼; a load of 1½ lbs. will cause the curve to intersect the upper edge of the ribbon at the graduation marked 1½; a load of 2 lbs. will cause the curve to intersect the edge at the graduation numbered 2; 3 lbs. will cause the curve to intersect the edge at the graduation numbered 3; 4 lbs. will cause the curve and edge to intersect at the graduation numbered 4, etc. Thus, when the ribbon is in the position in which it is shown in Figure II, the weights of loads on the platform will be indicated automatically and directly in pounds and fractions thereof. As a guide by which the ribbon may be reset to the position in which it is shown in Figure II without placing a known weight upon the scale platform, a pointer 34 is mounted, by means of a bracket 35, within the casing 3 and axially located where the curve 13 intersects the upper edge of the ribbon 22 when a load of 1 lb. is placed upon the platform 9.

If it is desired to weigh in libras, a 1-libra weight may be placed upon the platform 9 and the ribbon 22 shifted, by turning the knob 25, until the graduation numbered 1 is brought to the place at which the curve 13 intersects the upper edge of the ribbon 22 with the 1-libra weight on the platform. With the ribbon 22 in such position, the weight of any commodity placed upon the platform will be automatically and directly indicated in libras. By placing a 1000-gram weight on the platform 9 and shifting the ribbon until the graduation numbered 1000 is at the point of intersection between the curve 13 and the upper edge of the ribbon 22, the scale may be adjusted to indicate weight automatically and directly in grams. Similarly it may be adjusted to weigh in mommes, okas and other units of weight.

For the purpose of counterbalancing the weights of containers, the scale is equipped with a tare poise 36. With the weight of a container counterbalanced by the tare poise 36, a pint of liquid may be placed in the container, the ribbon shifted so that the graduation numbered 1 is at the point of intersection of the curve 13 and the upper edge of the ribbon 22, and the scale thus adjusted to indicate in pints. Similarly it may be set to indicate in other units of volume.

The form of scale illustrated is well adapted for use in determining the yardage of bolts of cloth. In using the scale for this purpose, the tare poise 36 is first set to counterbalance the weight of the board upon which the cloth is wrapped, if there be such a board. The ribbon is then shifted until the graduation numbered with the number of yards per pound of the goods is in registration with the pointer 34. With the bolt of goods on the platform 9, the curve 13 will intersect the upper edge of the ribbon 22 at the place where the markings on the ribbon correspond to the number of yards in the bolt of cloth. The scale may be used likewise to indicate other dimensional units, such as linear inches, square feet, or cubic centimeters.

The specific gravity of a liquid may be determined by first placing a container of water and a container of the liquid to be tested on the platform 9 and counterbalancing the containers and liquids by means of the tare poise 36, then suspending a solid in the water and shifting the ribbon until the graduation numbered 1 is at the point of intersection of the curve 13 with the upper edge of the ribbon, and finally suspending the same solid in the liquid to be tested, whereupon the specific gravity of the liquid to be tested will be indicated by the marking on the ribbon 22 at the place where it is intersected by the curve 13.

To determine the specific gravity of a solid object heavier than water, place a vessel of water on the platform 9 and counterbalance it by means of the tare poise 36; then suspend the object in the water by a thread or the like and shift the ribbon until the graduation numbered 1 is at the point where the curve 13 intersects the upper edge of the ribbon, then lower the object until it rests on the bottom of the vessel, whereupon the curve 13 will move to intersect the upper edge of the ribbon 22 at the place where the markings on the ribbon correspond to the specific gravity of the object.

If it is desired to count identical pieces such as screws or bearing balls, a number of pieces sufficient to cause the left end of the curve 13 to rise above the upper edge of the ribbon 22 is placed upon the platform. If, for example, 12 pieces are placed upon the platform to bring the curve 13 into proper preliminary position, the ribbon 22 is shifted to bring the graduation numbered 12 to the point of intersection of the curve with the upper edge of the ribbon. If then the remainder of the lot be placed on the platform, the number of pieces will be automatically and directly indicated by the markings on the ribbon 22 at the place where its upper edge is intersected by the curve 13.

By placing an article or substance which is to be processed upon the scale platform and shifting the ribbon 22 until the graduation numbered 100 is at the point of intersection of the curve 13 with the upper edge of the ribbon and subsequently placing the article or substance, after processing, upon the scale platform with the ribbon in the same position, the weight after processing, in terms of percentage of the original weight, may be read upon the ribbon at the point of intersection of the curve 13 with its upper edge. If it is desired to divide a quantity of material into, say, 37 equal portions, the material may be placed upon the scale platform and the ribbon shifted until the graduation numbered 37 is at the point where the upper edge of the ribbon is intersected by the curve 13. With the ribbon in this position, portions may be removed to bring the point of intersection successively to the graduations numbered 36, 35, 34, etc. The material may be thus aliquoted without deficiency or residue.

Numerous other determination of values, one factor of which is weight or is measurable by force or movement, may be easily and quickly made since the ribbon may be positioned in accordance with any selected datum. In general, the device will automatically indicate any value which can be found by first making a weighment or like measurement and then making a slide rule computation in which the result of the weighment or measurement is used as a factor.

In order to enhance the clearness of the indications, the cylindrical surface and the graduated ribbon are illuminated by a lamp 37 mounted inside the casing 3 behind the frame 38 of a transparent window 39 and a magnifying lens 40 is so mounted on rods 41 and 42 that it is slidable into position to magnify indications that are to be carefully read.

In Figure X is illustrated a modification of the device in which the pointer 34a is so mounted that it may be adjusted to any desired position, and the instrument is equipped with a stationary graduated strip 43a the graduations of which may be used as fixed points of reference according to which the pointer 34a may be located or relocated. This modification is useful for indicating values having more than two factors. If, for example, it were desired to know the money value of a lot of screws at 27¢ per gross, the operator would first count onto the platform enough screws to bring the curve 13a into preliminary indicating position. This might require 20 screws. He then would shift the ribbon 22a until the graduation numbered 20 was at the point of intersection of the line 13a with the upper edge of the ribbon 22a, move the pointer 34a into registration with the graduation on the ribbon 22a having a value of 144, then again shift the ribbon 22a until the graduation having a value of 27 was in registration with the pointer 34a. Upon placing the lot of screws on the platform, the curve 13a would move to a position in which the money value of the lot at 27¢ per gross would be indicated by the marking on the ribbon 22a at the place of intersection of the curve with the upper edge of the ribbon.

In the form of ribbon illustrated in Figures I, II and III, the graduations representing less than unity are distributed according to halves, quarters and eighths. Alternatively the graduations representing less than unity may be distributed by decimal divisions in the manner shown on the strip 43a in Figure X.

In the form of device illustrated in Figures I, II and V, the curve 13 extends from a point on the left end of the cylinder 1/100 of the circumferential distance from the zero line 14 to the capacity line 33 and the graduations on the metallic ribbon 22 are so spaced that when the ribbon is shifted, by means of the knob 25, so that the graduation numbered 1 is at the left end of the cylinder, the graduation numbered 100 will be at the right end of the cylinder. If it is desired that the graduations along the ribbon be more widely spaced, the curve 13 may be made to begin farther from the zero line 14 (for example, 1/50 of the distance from the zero line 14 to the capacity line 33) and the graduations along the ribbon may be so spaced that when the graduation numbered 1 is at the left end of the cylinder, the graduation numbered 50 will be at the right end of the cylinder. In such case, however, the curve 13 will not be brought into indicating position at the upper edge of the ribbon 22 unless a load equal to at least 1/50 of the capacity of the scale is placed upon the platform 9.

If the series of weight graduations 15 be omitted from the cylindrical surface, the surface inscribed with the curve 13 may be used with the ribbon 22 without change for instruments of different capacities. The curve and ribbon illustrated in Figures I to V, for examples, may be used not only in a scale of 24 lbs. capacity, but in a scale having a capacity of 50 lbs., or in a scale having a capacity of 100 lbs. or 1,000 lbs. or more.

While the surface bearing the curve is a cylindrical surface in the form of device illustrated, a revoluble conical surface, or a plane surface movable rectilinearly, or an angularly movable plane surface may be employed.

The embodiment of my invention herein shown and described is to be regarded as illustrative only, and it is to be understood that the invention is susceptible to variation, modification and change within the spirit and scope of the subjoined claims.

Having described my invention, I claim:

1. In a device of the class described, in combination, automatic load-counterbalancing mechanism, a member marked with a row of logarithmically arranged indicia, a cylindrical member carrying a logarithmic curve on its surface and connected to said automatic load-counterbalancing mechanism to be moved therewith, a portion of said cylindrical surface lying adjacent said indicia, said curve being moved logarithmically along said indicia by such movement of said cylindrical member, and means for shifting the member marked with said indicia across the direction of movement of the adjacent portion of the surface of said cylindrical member to correspond with a selected datum.

2. In a device of the class described, in combination, automatic load-counterbalancing mechanism, a member marked with a row of logarithmically arranged indicia, a member carrying a logarithmic curve and connected to said automatic load-counterbalancing mechanism to be moved therewith, a portion of said curve lying adjacent said indicia, said curve being logarithmically movable along said indicia by such movement of the member carrying said curve, and means for shifting the member marked with said indicia across the direction of movement of the member carrying said curve to correspond with a selected datum.

3. In a device of the class described, in combination, automatic load-counterbalancing mechanism, a member marked with a row of logarithmically arranged indicia, a member carrying a curve and connected to said automatic load-counterbalancing mechanism to be moved therewith, a portion of said curve lying adjacent said indicia, said curve being logarithmically movable along said indicia by such movement of the member carrying said curve, and means for shifting the member marked with said indicia to correspond with a selected datum.

4. In a device of the class described, in combination, automatic load-counterbalancing mechanism, a member marked with a row of logarithmically arranged indicia, means whereby said member may be shifted longitudinally of said row of indicia to correspond with a selected datum, a member carrying a curve and connected to said automatic load-counterbalancing mechanism to be moved therewith, a portion of said curve lying adjacent said indicia, said curve being logarithmically movable along said indicia by movement of the member carrying said curve.

5. In a device of the class described, in combination, automatic force measuring mechanism, a member marked with a row of logarithmically arranged indicia, means whereby said member may be shifted longitudinally of said row of indicia to correspond with a selected datum, a member carrying a curve and connected to said automatic force measuring mechanism to be moved therewith, a portion of said curve lying adjacent said indicia, said curve being logarithmically movable along said indicia by such movement of the member carrying said curve.

6. In a device of the class described, in combination, automatic load-counterbalancing mechanism, a flexible strip marked with a row of logarithmically arranged indicia, a cylindrical member carrying a logarithmic curve on its cylindrical surface and connected to said automatic load-counterbalancing mechanism to be moved therewith, a portion of said cylindrical surface carrying said curve lying closely behind said strip, the intersection of said curve and an edge of said strip being logarithmically movable along the edge of said strip by such movement of said cylindrical member, means for shifting said strip longitudinally to correspond to a selected datum, and a pointer pointing to graduations on said strip to indicate its selected position.

7. In a device of the class described, in combination, automatic load-counterbalancing mechanism, a flexible strip marked with a row of logarithmically arranged indicia, a cylindrical member carrying a logarithmic curve on its cylindrical surface and connected to said automatic load-counterbalancing mechanism to be moved therewith, a portion of said cylindrical surface carrying said curve lying closely behind said strip, the intersection of said curve and an edge of said strip being logarithmically movable along the edge of said strip by such movement of said cylindrical member, means for shifting said strip longitudinally to correspond to a selected datum, a pointer pointing to graduations on said strip to indicate its selected position, and means for adjusting the position of said pointer.

8. In a device of the class described, in combination, automatic load-counterbalancing mechanism, a flexible strip marked with a row of logarithmically arranged indicia, a cylindrical member carrying a logarithmic curve on its cylindrical surface and connected to said automatic load-counterbalancing mechanism to be moved therewith, a portion of said cylindrical surface carrying said curve lying closely behind said strip, the intersection of said curve and an edge of said strip being logarithmically movable along the edge of said strip by such movement of said cylindrical member, means for shifting said strip longitudinally to correspond to a selected datum, a pointer pointing to graduations on said strip to indicate its selected position, means for adjusting the position of said pointer, and an additional member having points of reference for facilitating the location of said pointer in various positions of adjustment.

9. In a device of the class described, in combination, automatic load-counterbalancing mechanism, a flexible strip marked with a row of logarithmically arranged indicia, a cylindrical member carrying a logarithmic curve on its cylindrical surface and connected to said automatic load-counterbalancing mechanism to be moved therewith, a portion of said cylindrical surface carrying said curve lying closely behind said strip, the intersection of said curve and an edge of said strip being logarithmically movable along the edge of said strip by such movement of said cylindrical member, means for shifting said strip longitudinally to correspond to a selected datum, a pointer pointing to graduations on said strip to indicate its selected position, means for adjusting the position of said pointer, and an additional member having points of reference for facilitating the location of said pointer in various positions of adjustment, said points of reference being logarithmically arranged.

10. In a device of the class described, in combination, automatic force measuring mechanism, a member marked with a row of logarithmically arranged indicia, means whereby said member may be shifted longitudinally of said row of indicia to correspond to a selected datum, a member carrying a curve and connected to said automatic force measuring mechanism to be moved therewith, a portion of said curve lying adjacent said indicia, said curve being logarithmically movable along said indicia by movement of the member carrying said curve, and a pointer pointing to said indicia to indicate the selected position of the member marked with said indicia.

11. In a device of the class described, in combination, automatic force measuring mechanism, a member marked with a row of logarithmically arranged indicia, means whereby said member may be shifted longitudinally of said row of indicia to correspond to a selected datum, a member carrying a curve and connected to said measuring automatic force mechanism to be moved therewith, a portion of said curve lying adjacent said indicia, said curve being logarithmicaly movable along said indicia by movement of the member carrying said curve, a pointer pointing to said indicia to indicate the selected position of the member marked with said indicia, and means for adjusting the position of said pointer.

12. In a device of the class described, in combination, automatic force measuring mechanism, a member marked with a row of logarithmically arranged indicia, means whereby said member may be shifted longitudinally of said row of indicia to correspond to a selected datum, a member carrying a curve and connected to said automatic force measuring mechanism to be moved therewith, a portion of said curve lying adjacent said indicia, said curve being logarithmically movable along said indicia by movement of the member carrying said curve, a pointer pointing to said indicia to indicate the selected position of the member marked with said indicia, means for adjusting the position of said pointer, and an additional member having points of reference for facilitating the location of said pointer in various positions of adjustment.

13. In a device of the class described, in combination, automatic force measuring mechanism, a member marked with a row of logarithmically arranged indicia, means whereby said member may be shifted longitudinally of said row of indicia to correspond to a selected datum, a member carrying a curve and connected to said automatic force measuring mechanism to be moved therewith, a portion of said curve lying adjacent said indicia, said curve being logarithmically movable along said indicia by movement of the member carrying said curve, a pointer pointing to said indicia to indicate the selected position of the member marked with said indicia, means for adjusting the position of said pointer, and an additional member having points of reference for facilitating the location of said pointer in various positions of adjustment, said points of reference being logarithmically arranged.

CHARLES O. MARSHALL.